United States Patent [19]

Ettischer et al.

[11] 3,779,145
[45] Dec. 18, 1973

[54] FILM MOVEMENT PREVENTING MEANS FOR CAMERAS

[75] Inventors: Helmut Ettischer, Ruit; Kurt Steisslinger, Stuttgart; Peter Huschle, Boblingen, all of Germany

[73] Assignee: Eastman Kodak Company, Rochester, N.Y.

[22] Filed: Aug. 4, 1972

[21] Appl. No.: 277,934

[30] Foreign Application Priority Data
Oct. 26, 1971  Germany............... P 21 53 206.9

[52] U.S. Cl. .......... 95/31 FM, 95/31 AC, 95/31 FL
[51] Int. Cl. ....................... G03b 1/62, G03b 1/14
[58] Field of Search ............. 95/31 FM, 31 FL, 95/31 AC

[56] References Cited
UNITED STATES PATENTS
3,148,605  9/1964  Peterson et al. ............... 95/31 FM
3,605,595  9/1971  Irwin ........................... 95/31 FL Primary Examiner—Robert P. Greiner
Attorney—W. H. J. Kline

[57] ABSTRACT

A camera for roll film perforated at predetermined metering intervals includes a transport mechanism for advancing the film along an exposure plane and a metering mechanism having an inactive condition and an active condition for stopping film transport when the film is correctly positioned for exposure. A film sensing pawl is mounted for movement between a retracted position resting on the film surface, an extended position transversing the film while in a film perforation and a metering position spaced from the extended position in the direction of film advancement. A resilient force on the sensing member urges the sensing member from its metering position toward its extended position. Any tendency of the resilient force acting on the sensing member to move the film during exposure is opposed, at least during operation of the camera's exposure mechanism, by a member clamping the sensing member so that the force is not transmitted by the sensing member to the filmstrip.

9 Claims, 7 Drawing Figures

FILM MOVEMENT PREVENTING MEANS FOR CAMERAS

CROSS-REFERENCE TO RELATED APPLICATION

Reference is made to commonly assigned, copending U.S. Patent application, Ser. No. 203,524 entitled Film Metering Mechanisms For Cameras, and filed Dec. 1, 1971 in the name of David E. Beach.

BACKGROUND OF THE INVENTION

1. Field of the Invention

The present invention relates to cameras having means for detecting the presence of a film perforation to selectively lock and release the film transport mechanism, and more particularly to such cameras having means for minimizing any surge of force from the detecting means on the film during an exposure interval.

2. Description of the Prior Art

The present invention is an improvement over cameras of the type disclosed in copending, coassigned U.S. Patent Application, Ser. No. 203,524, entitled "Film Metering Mechanism for Cameras" filed Dec. 1, 1971 in the name of David E. Beach. In the camera therein disclosed, a metering lever is movable between an inactive position and an active position disabling the camera's film transport mechanism. A film sensing pawl is mounted for movement from a retracted position engaging the film surface, through an extended position transversing the film when intercepting one of the film perforations, to a metering position spaced from the extended position in the direction of film advancement by the trailing edge of the perforation as the film is advanced. The film sensing pawl and the metering lever are associated such that the metering lever is moved to its active position upon movement of the sensing pawl to its metering position. A spring urges the sensing pawl from its metering position toward its extended position and, since the metering pawl remains in the film perforation during exposure, the spring force is applied also to the trailing edge of the film perforation. This force on the film is opposed by frictional forces between camera elements and between the film and camera and/or cartridge surfaces. When the shutter is tripped, minor vibrations travel through the camera. These vibrations may relieve static friction wherever it occurs within the camera. Loss of frictional forces restraining the film can cause the spring force on the film from the pawl to move the film during exposure.

Various techniques have been suggested for overcoming the effect of the spring force on the film. Some such techniques include removing the sensing pawl from the perforation after the film has been advanced and/or increasing the frictional drag on the film from the camera.

SUMMARY OF THE INVENTION

It is an object of the present invention to reduce or eliminate the possibility of film movement during the exposure period by blocking movement of the film sensing pawl during a picture-taking operation when the camera vibrations can suddenly relieve frictional restraints.

In a preferred embodiment of the present invention, this object has been accomplished by moving a blocking or clamping member into contact with the film sensing pawl when the film transport means is disabled in preparation for making an exposure.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
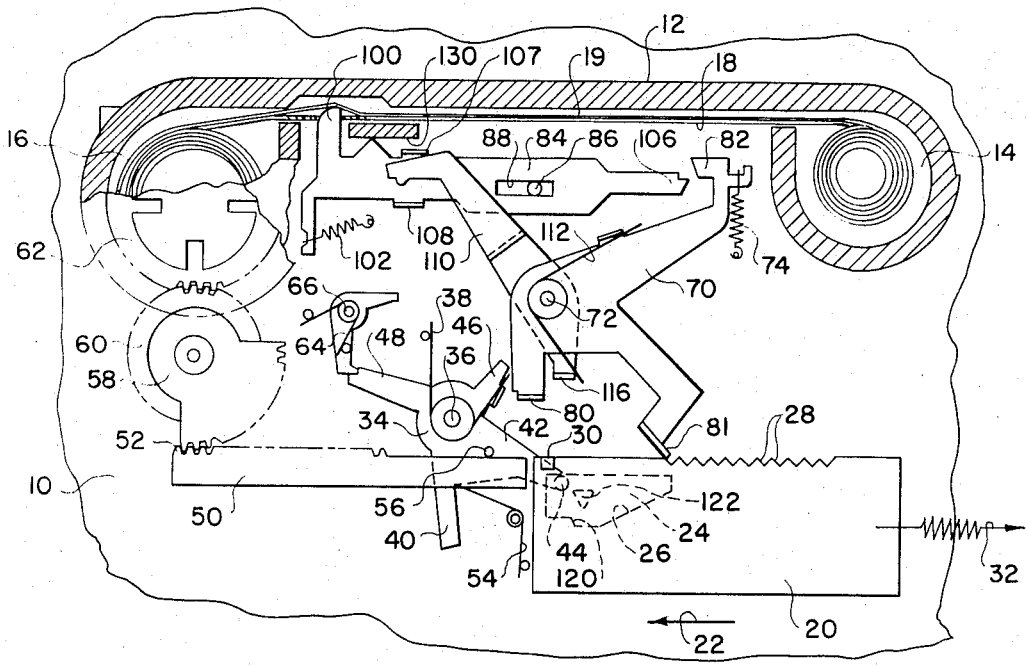
FIG. 1 is a view of a portion of a camera in accordance with the present invention and showing a cartridge containing a filmstrip loaded in the camera, the camera elements being shown in their positions immediately preceding an exposure.

Because cameras are well known, the present description will be directed in particular to elements forming part of, or cooperating more directly with apparatus in accordance with the present invention. It is to be understood that camera elements not specifically shown or described may take various forms well known to those skilled in the art.

Referring to the drawings, a camera having a housing 10 has been shown with a film cartridge 12 received therein. The film cartridge has supply and take-up chambers 14 and 16, respectively, which enter corresponding supply and take-up compartments in the camera housing. A filmstrip 18 is carried by the cartridge and is perforated along one edge at predetermined metering intervals. The cartridge may contain opaque backing paper 19, and may be of the type shown in coassigned U.S. Pat. No. 3,138,081 which is issued on June 23, 1964 to Hubert Nerwin.

A film advance slide 20 is mounted in camera housing 10 so as to be movable from the position shown in FIG. 1 in the direction of arrow 22. Slide 20 has a recessed area 24 with a cam surface 26 formed thereby, a plurality of rechet teeth 28 and a lug 30. A spring 32 urges slide 20 to the right as viewed in FIG. 1.

A shutter drive member 34 is rotatably carried on a stud 36 in housing 10 and is biased in a clockwise direction as viewed in FIG. 1 by a spring 38. An arm 40 on drive member 34 actuates a shutter, not shown, during clockwise rotation of the drive member to effect an exposure. A second arm 42 of the drive member has a cam follower 44 extending into recess 24 of slide 20. The function of two other arms 46 and 48 on drive member 34 will be explained hereinafter.

A rack 50, having a plurality of gear teeth 52, is slidably mounted in housing 10 and is urged by a spring 54 into contact with a stud 56 on drive member 34. Teeth 52 mesh with corresponding gear teeth on a gear sector 58 which, through gears 60 and 62, advances film from supply compartment 14 to take-up compartment 16 when rack 50 is moved to the left. Gear sector 58 is connected to gear 60 through a one-way clutch, not shown, so that gears 60 and 62 do not turn when rack 50 is moved to the right.

Figure 2:
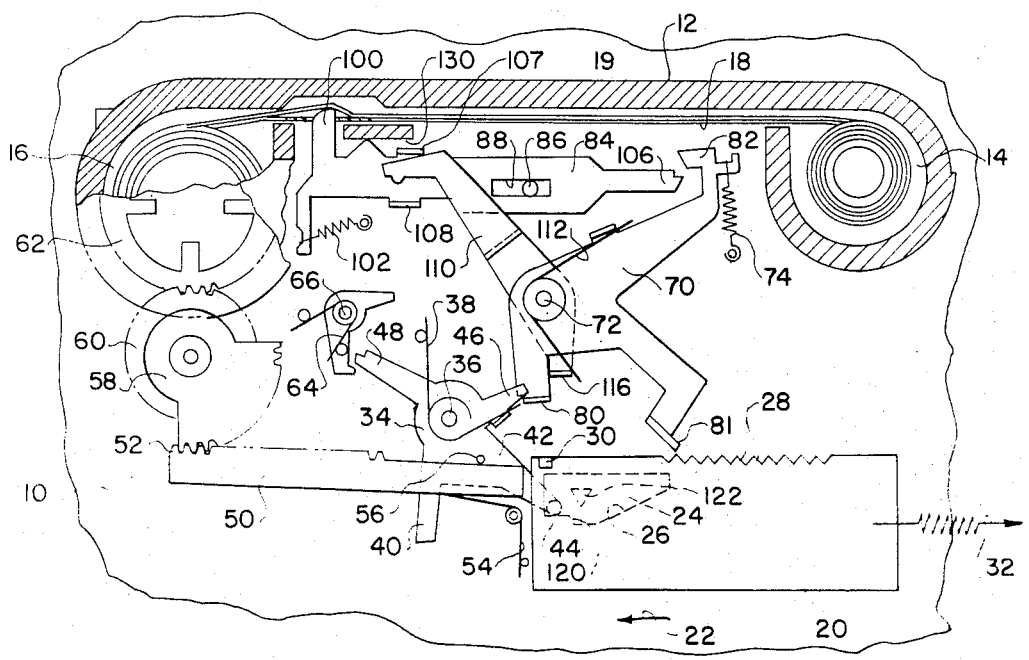
FIG. 2 is a view similar to FIG. 1 showing the camera elements in their position after the shutter has been tripped.

A latch member 64 is pivotally mounted in housing 10 on a stud 66 for movement between a latch position (retaining drive member 34 in its cocked position; FIG. 1) and a release position (permitting spring 38 to rapidly move the drive member to its uncocked position as shown in FIG. 2).

A metering mechanism includes a lever 70 rotatably carried in housing 10 on a stud 72 and biased in a clockwise direction by a spring 74. Lever 70 has three arms and three tabs 80-82 respectively on the end of those arms.

A film sensing member 84 is rotatably and slidably carried by a pin 86 which extends into a slot 88 in the sensing member. A film sensing pawl 100 on the sensing member extends toward film 18 at the camera's exposure plane. A spring 102 tends to rotate the sensing member in a clockwise direction to urge sensing pawl 100 to a film transversing position as shown in FIG. 1. The sensing member has a projection 106 on one end and a pair of bent tabs 107 and 108, the functions of these elements to be explained hereinafter.

A blocking member 110 is rotatably carried by stud 72 and is urged in a clockwise direction by a spring 112 against bent tab 107 on the sensing member. The lower portion of the blocking member has tab 116 which lies in the path of one arm of lever 70.

OPERATION

FIG. 1 shows the camera elements positioned after the film has been advanced and before an exposure is made. To make an exposure, latch 64 is rotated in a clockwise direction (by the camera's body release lever, not shown), releasing drive member 34 to run down in a clockwise direction from its FIG. 1 position and to thereby operate the shutter mechanism by its arm 40. During such running down movement of drive member 34, its arm 46 engages tab 80 on lever 70 to rotate the lever in a counterclockwise direction, thereby removing tab 81 from ratchet teeth 28 of slide 20. At the same time, pin 56 on the drive member moves rack 50 out of alignment with abutment 30 on the slide. Spring 102 retains sensing pawl 100 in the film perforation. The camera elements are now in their respective positions shown in FIG. 2, and the camera is ready to be operated to advance the next succeeding film frame to the exposure station.

Referring to FIG. 2, the operator manually moves slide 20 in the direction of arrow 22, and, as the slide moves, follower 44 rides along the bottom surface of recess 24 and falls off a step 120 to the beginning of surface 26. To insure that this step is not missed, a projection 122 is provided. As follower 44 falls off the step, drive member 34 rotates slightly in a clockwise direction causing further counterclockwise rotation of lever 70. Blocking member 110 is rotated further in a counterclockwise direction to engage bent tab 108 and to thereby rotate sensing member 84 counterclockwise. As soon as sensing pawl 100 clears the perforation, spring 102 moves the sensing member to the right.

As slide 22 continues to move to the left, follower 44 moves up surface 26, causing shutter drive member 34 to rotate in a counterclockwise direction against the force of spring 38 until arm 48 thereon snaps behind latch member 64.

Figure 3:
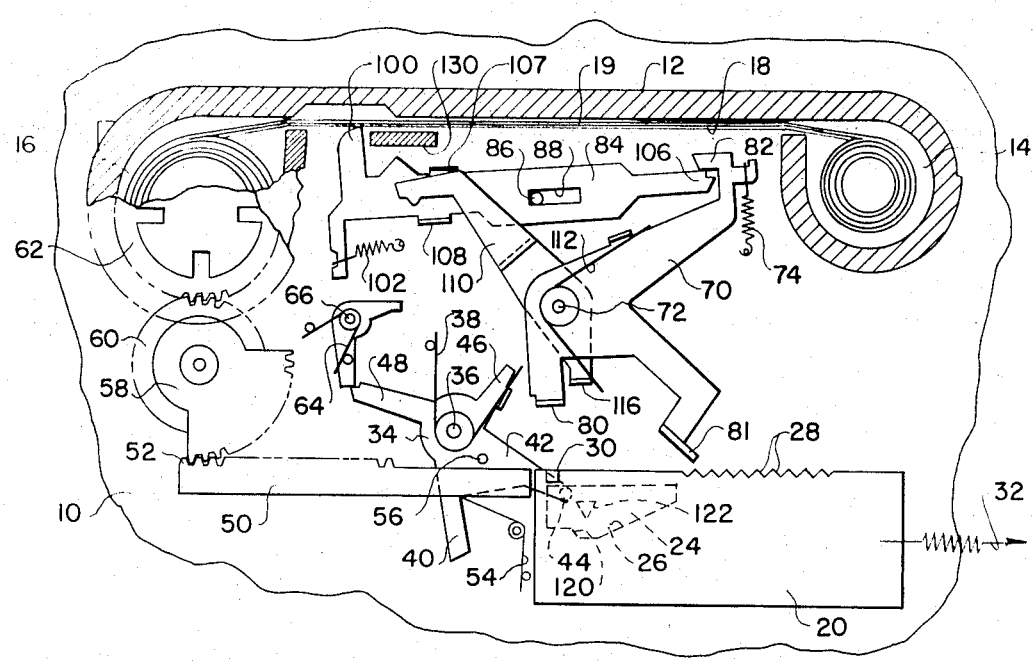
FIG. 3 is a view similar to FIG. 1 showing the camera elements as film is being advanced.

During the first stroke of slide 20, lug 30 misses rack 50 because the rack has been held in its lower, FIG. 1 position by pin 56 on drive member 34. Therefore, during the first movement of the slide, there is no film advancement, and, as the operator allows spring 32 to return slide 20 to the right, rack 50 is raised by spring 54 into alignment with abutment 30 on the slide. The camera elements are now in their respective positions shown in FIG. 3.

Now, on the second operational stroke of slide 20 in the direction of arrow 22, lug 30 on the slide moves rack 50 to the left to advance film from supply compartment 14 to take-up compartment 16 of the cartridge. As the film advances, when a perforation reaches the position of film sensing pawl 100, the pawl is moved into the preforation by spring 102 so that the sensing member is moved to the left by the advancing film.

At the moment that the next succeeding frame of film reaches the camera's exposure station, tab 106 on sensing member 84 falls off of tab 82 of lever 70, enabling spring 74 to rotate the intermediate member in a clockwise direction until tab 81 engages ratchet teeth 28 on slide 20 to prevent further film advancement. When the operator releases slide 20, it is returned to the right by spring 32. During such rotation of lever 70, blocking member 110 clamps sensing member 84 by cooperation with an abutment surface 130 on housing 10. The camera elements are now positioned as shown in FIG. 1 and the camera is ready to be operated to make an exposure. Note that the clamping of sensing member 84 between member 110 and surface 130 prevents rightward movement of the sensing member. Thus, when the shutter is tripped and camera vibrations are set up, there is no movement of the film sensing pawl which might cause film movement toward the camera's supply chamber due to the loss of frictional resistance mentioned above.

Figure 4:
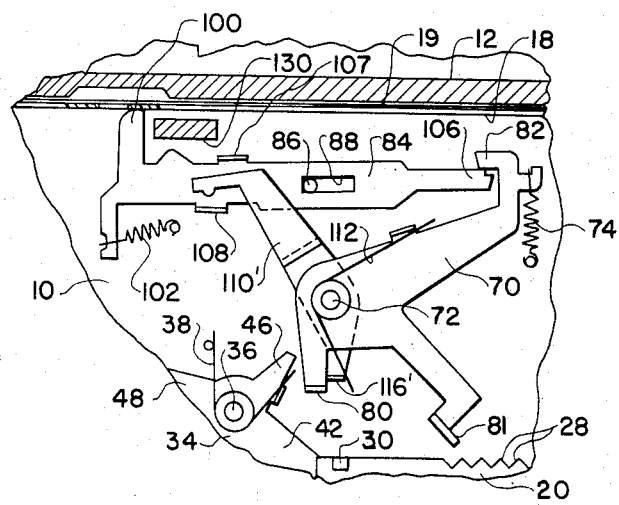
FIGS. 4–6 are views of a second embodiment of a camera in accordance with the present invention showing the camera elements in three sequential positions as film is advanced.
Figure 5:
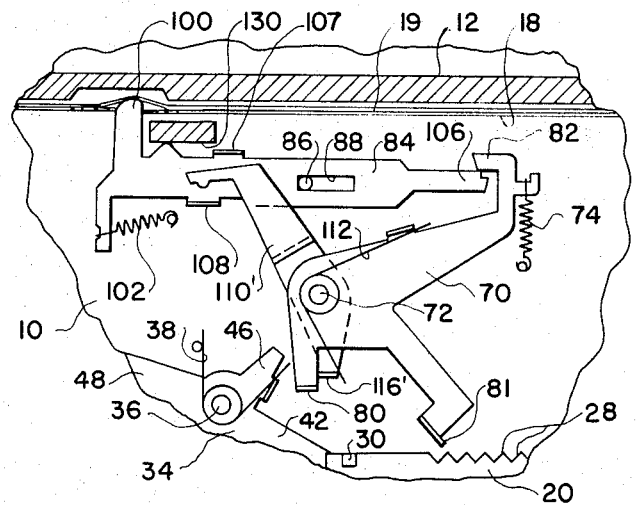
Figure 6:
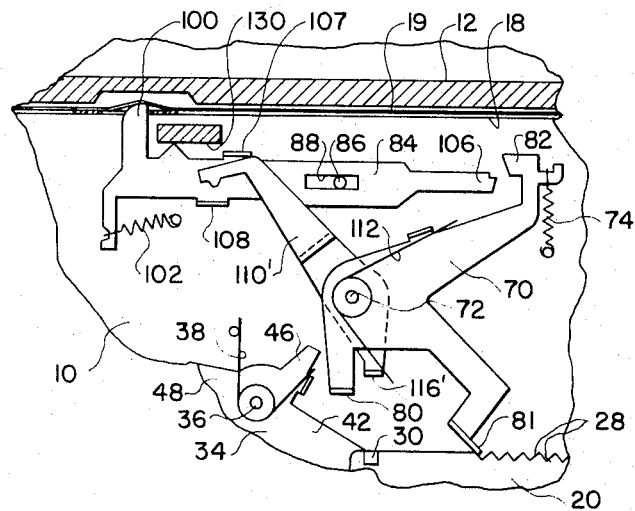

In FIGS. 4 and 5, we have shown a second embodiment of the present invention wherein blocking member 110' is held out of engagement with tab 107 of sensing member 84 until metering lever 70 has reached from tab 106 of the sensing member. FIG. 4, which corresponds in sequence to FIG. 3 of the first embodiment, shows that after an exposure has been made and the shutter cocked, clamping member 110' is held out of contact with tab 107 by engagement of lever 70 and tab 116'. In FIG. 5, a preforation has reached sensing pawl 100, but clamp member 110' has still not contacted tab 107. Only when metering lever 70 has been released, as in FIG. 6, can spring 112 move clamp member 110' into engagement with bent tab 107, thus preventing additional drag during the final stage of film advance.

Figure 7:
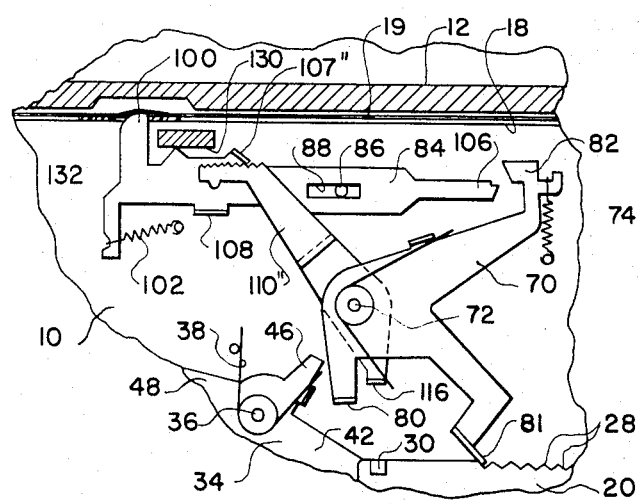
FIG. 7 is a view of a third embodiment of a camera in accordance with the present invention.

In accordance with the embodiments of FIGS. 1-6, the surface of clamp members 110 and 110' which cooperate with tab 107 is flat. In order to increase the holding action between the clamp member and sensing member 84, this surface may be provided with teeth 132 as in the embodiment of FIG. 7. In this case, tab 107" is inclined so that one of its edges engages with teeth 132 of blocking member 110".

The invention has been described in detail with particular reference to a preferred embodiment, but it will be understood that variations and modifications can be effected within the spirit and scope of the invention.

We claim:

1. In a camera adapted to receive a film-strip perforated at predetermined metering intervals and having (1) transport means for advancing a received filmstrip along the camera's exposure plane, (2) a metering mechanism having an inactive condition and an active condition disabling said transport means, (3) a film sensing member movable from a retracted position on one side of said exposure plane to an extended position transversing said exposure plane when intercepting one of the perforations of a received filmstrip, and, by the trailing edge of the perforation as the received filmstrip is advanced, to a metering position spaced from said extended position in the general direction of filmstrip advancement, (4) means associated with said sensing member and said metering mechanism for placing said metering mechanism in its active condition upon movement of said sensing member to its metering position, and (5) means for applying a resilient force to said sensing member in a direction urging said sensing member from its metering position toward its extended position; the improvement comprising means for preventing movement of said sensing member by said force applying means from its metering position toward its extended position at least while said metering mechanism is in its active condition, said movement preventing means including means for clamping said sensing member against such movement.

2. The improvement as defined in claim 1 wherein said clamping means includes:
   a blocking lever;
   spring means for urging said blocking lever toward clamping engagement with said sensing member; and
   means associated with said blocking lever and said metering mechanism for moving said blocking lever out of engagement with said sensing member when said metering mechanism is in its inactive condition.

3. The improvement as defined in claim 2 further comprising means associated with said blocking lever and said transport means for moving said blocking lever out of clamping engagement with said sensing member upon operation of said transport means.

4. The improvement as defined in claim 3 further comprising means associated with said sensing member and said blocking lever for moving said sensing member to its retracted position upon movement of said blocking lever out of clamping engagement with said sensing member upon operation of said transport means.

5. In a camera having (1) supply and take-up chambers for receiving respectively supply and take-up rolls of a film-strip perforated at predetermined metering intervals, (2) transport means operable to advance a received filmstrip along a camera exposure plane from said supply chamber to said take-up chamber, (3) an exposure mechanism operable to effect the exposure of received filmstrip at the exposure plane, (4) a metering mechanism having an inactive condition and an active condition disabling said transport means, (5) a film sensing member movable from a retracted position on one side of said exposure plane to an extended position transversing said exposure plane when intercepting one of the perforations of a received filmstrip, and, by the trailing edge of the perforation as the received filmstrip is advanced, to a metering position spaced from said extended position in the general direction of filmstrip advancement, (6) spring means urging said sensing member in a direction from its metering position toward its extended position, and (7) means associated with said sensing member and said metering mechanism for placing said metering mechanism in its active condition upon movement of said sensing member to its metering position; the improvement comprising:
   a blocking member mounted in said camera for movement toward and away from a predetermined position, said blocking member being constructed to block movement of said sensing member by said spring means when in its predetermined position; and
   means for locating said blocking member at its predetermined position at least during operation of said exposure mechanism.

6. The improvement as defined in claim 5 further comprising means associated with said sensing member and said blocking member for moving said sensing member from its metering position to its retracted position upon movement of said blocking member from its predetermined position.

7. The improvement as defined in claim 6 wherein said last-mentioned means includes a cam surface on said sensing member contactable by said blocking member.

8. The improvement as defined in claim 5 further comprising means associated with said blocking member and said transport means for moving said blocking member from its predetermined position upon initial operation of said transport means.

9. In a camera having (1) supply and take-up chambers for receiving respectively supply and take-up rolls of a filmstrip perforated at predetermined metering intervals, (2) transport means operable to advance a received filmstrip along a camera exposure plane from said supply chamber to said take-up chamber, (3) a shutter mechanism movable from a cocked position to a run-down position to effect the exposure of received filmstrip at the exposure plane, (4) cocking means operable to move said shutter mechanism to its cocked position, (5) a metering mechanism having an inactive condition and an active condition disabling said transport means, (6) a film sensing member movable from a retracted position on one side of said exposure plane to an extended position transversing said exposure plane when intercepting one of the perforations of a received filmstrip, and, by the trailing edge of the perforation as the received filmstrip is advanced, to a metering position spaced from said extended position in the general direction of filmstrip advancement, and (7) means associated with said sensing member and said metering mechanism for placing said metering mechanism in its active condition upon movement of said sensing member to its metering position; the improvement comprising:
   a blocking member movable toward and away from a predetermined position, said blocking member being arranged to prevent movement of said sensing member in a direction along the exposure plane opposed to the direction of film advancement when in its predetermined position;
   means for locating said blocking member at its predetermined position at least during run-down movement of said shutter mechanism; and
   means associated with said cocking means for moving said blocking member from its predetermined position upon operation of said cocking means.

* * * * *